US012746863B2

(12) United States Patent
Ono et al.

(10) Patent No.: US 12,746,863 B2
(45) Date of Patent: Sep. 29, 2026

(54) ARMREST FOR VEHICLE

(71) Applicants: Nissan Motor Co., Ltd., Yokohama (JP); Marelli Co., Ltd., Saitama-city (JP)

(72) Inventors: Emiko Ono, Kanagawa (JP); Yuuki Abe, Kanagawa (JP); Mamoru Ueda, Kanagawa (JP); Makoto Saito, Saitama-city (JP); Kota Uetake, Saitama-city (JP)

(73) Assignees: Nissan Motor Co., Ltd., Yokohama (JP); Marelli Co., Ltd., Saitama-city (JP)

( * ) Notice: Subject to any disclaimer, the term of this patent is extended or adjusted under 35 U.S.C. 154(b) by 261 days.

(21) Appl. No.: 18/724,216

(22) PCT Filed: Dec. 21, 2022

(86) PCT No.: PCT/JP2022/047155
§ 371 (c)(1),
(2) Date: Jun. 26, 2024

(87) PCT Pub. No.: WO2023/136071
PCT Pub. Date: Jul. 20, 2023

(65) Prior Publication Data

US 2025/0065789 A1 Feb. 27, 2025

(30) Foreign Application Priority Data

Jan. 12, 2022 (JP) ................................ 2022-003130

(51) Int. Cl.
*B60N 2/75* (2018.01)
*B60R 7/04* (2006.01)
*B60R 11/00* (2006.01)

(52) U.S. Cl.
CPC ............ *B60N 2/793* (2018.02); *B60N 2/753* (2018.02); *B60N 2/773* (2018.02); *B60R 2011/0007* (2013.01); *B60R 2011/0014* (2013.01)

(58) Field of Classification Search
CPC ........ B60N 2/293; B60N 2/773; B60N 2/753; B60R 2011/0007; B60R 2011/0014; B60R 7/04
See application file for complete search history.

(56) References Cited

U.S. PATENT DOCUMENTS

2016/0001684 A1* 1/2016 An ........................ B60N 2/763
296/37.5
2018/0099591 A1* 4/2018 Choi ...................... B60N 2/753

FOREIGN PATENT DOCUMENTS

JP 60-184960 U 12/1985
JP 2007022425 A 2/2007

(Continued)

OTHER PUBLICATIONS

Extended European Search Report received for European Patent Application No. 22919298.4, mailed on Mar. 31, 2025, 10 pages.

*Primary Examiner* — Daniel J Colilla
(74) *Attorney, Agent, or Firm* — Spencer Fane LLP

(57) ABSTRACT

A vehicle armrest includes an opening/closing body, a switch knob and an operation transmission mechanism. The opening/closing body opens and closes an upper side of a storage section. The switch knob is configured to open the opening/closing body. The operation transmission mechanism opens the opening/closing body in response to an operation of the switch knob. The opening/closing body includes an inner base portion and an outer lid portion. The outer lid portion is movably connected to the base portion to move forward and rearward in a front-rear direction. The switch knob is disposed in a fixed position in a main box (Continued)

body farther forward than the front end of the opening/closing body when the lid portion has been moved to the forwardmost position.

9 Claims, 6 Drawing Sheets

(56) References Cited

FOREIGN PATENT DOCUMENTS

| | | | | |
|---|---|---|---|---|
| JP | 2008-105545 | A | | 5/2008 |
| JP | 2011020605 | A | | 2/2011 |
| JP | 2011-246006 | A | | 12/2011 |
| JP | 2018-118653 | A | | 8/2018 |
| KR | 20050058574 | A | * | 6/2005 |

* cited by examiner

ARMREST FOR VEHICLE

CROSS-REFERENCE TO RELATED APPLICATIONS

This application is a U.S. national stage application of International Application No. PCT/JP2022/047155, filed on Dec. 21, 2022, which claims priority to Japanese Patent Application No. 2022-003130, which was filed on Jan. 12, 2022.

BACKGROUND

Technical Field

The present invention relates to improvements to a vehicle armrest that also serves as the lid for a storage section in a center console box of a vehicle.

Background Information

A vehicle armrest known from the prior art is described in Japanese Patent Application Publication No. 2018-118653 (hereinafter referred to as Patent Document 1), for example. The vehicle armrest described in Patent Document 1 is provided with an inner door that covers the upper opening of a storage section in a main box body and an outer door provided on the inner door in such a way as to allow sliding in the front-rear direction of the vehicle. The inner door is connected to the main box body by a hinge and the pivoting of the inner door opens and closes the storage section. The outer door is connected to the inner door by a sliding mechanism, and an opening knob is attached to a hinge operation assembly at the front end thereof.

In the vehicle armrest, the position of the outer door can be adjusted in the front-rear direction of the vehicle to match the physical form, etc., of the driver; to open the storage section, the outer door is moved in the rear direction of the vehicle relative to the inner door and the opening knob is operated in this state, causing the inner and outer doors to pivot as a single unit.

SUMMARY

However, this conventional vehicle armrest requires that the outer door be moved towards the rear of the vehicle to open the storage section, and since the opening knob is provided on the outer door, it can be difficult to open the storage section if the driver's seat has been adjusted forward, for example. The object of the present invention is to solve these problems.

The present invention was devised in light of these problems of the prior art and has as an object to provide a vehicle armrest that is provided with functionality for adjustment in the front-rear direction of the vehicle, thereby improving ease of use by facilitating the opening of a storage section irrespective of the adjustment position of the driver's seat, etc.

A vehicle armrest according to the present invention also serves as a lid for a storage section in a vehicle center console box and is provided with an opening/closing body that opens and closes the upper side of the storage section, a switch knob for performing an opening operation of the opening/closing body, and an operation transmission mechanism for opening the opening/closing body in conjunction with an operation of the switch knob. The opening/closing body is provided with an inner base portion rotatably connected to a main box body, and an outer lid portion movably connected to the base portion to move forward and rearward in the front-rear direction. In the vehicle armrest, the switch knob is disposed in a fixed position in the main box body farther forward than the front end of the opening/closing body when the lid portion is moved in the forward-most position.

By this configuration, the vehicle armrest according to the present invention is provided with functionality for adjustment in the front-rear direction of the vehicle, thereby improving ease of use by facilitating the opening of the storage section irrespective of the adjustment position of the driver's seat, etc.

BRIEF DESCRIPTION OF THE DRAWINGS

Referring now to the attached drawings which form a part of this original disclosure, illustrative embodiments are shown.

DETAILED DESCRIPTION OF EMBODIMENTS

Figure 1A:
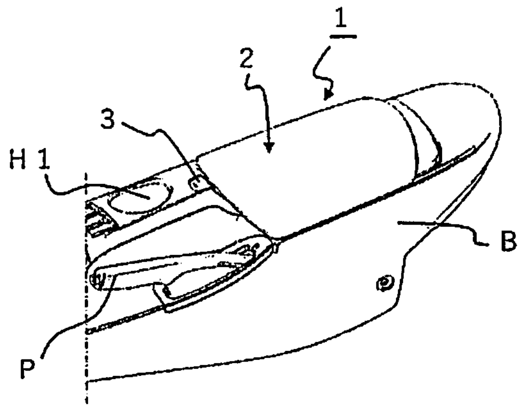
FIG. 1(A) is a perspective view (A) of a vehicle armrest showing the lid portion in a forward position.
Figure 1B:
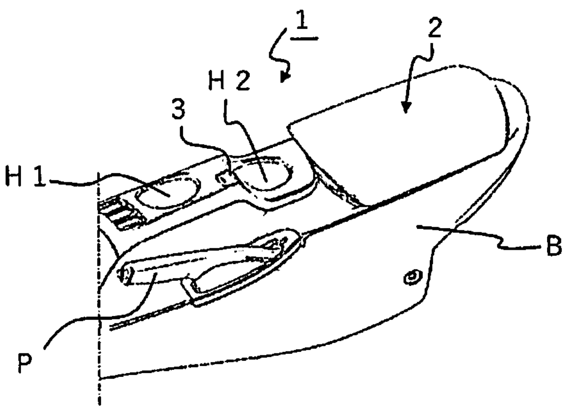
FIG. 1(B) is a perspective view of the vehicle armrest (showing the lid portion in a rearward position.

An embodiment of a vehicle armrest according to the present invention is described below with reference to the drawings. The vertical, front-rear, and left and right directions and positions in the following description are based on the orientation of the vehicle. The vehicle armrest according to the present invention also serves as a lid for a storage section in a vehicle center console box and is provided with not just the usual armrest part, but also a configuration for opening and closing the storage section and a configuration for adjusting the position in the front-rear direction.

Specifically, as shown in FIG. 1, a vehicle armrest 1 is provided with an opening/closing body that opens and closes the upper side of a storage section A of a main box body B, a switch knob 3 for performing an opening operation of the opening/closing body 2, and an operation transmission mechanism 4 for opening the opening/closing body 2 in conjunction with the operation of the switch knob 3. The main box body B shown in the drawings has a container holder H1 in front of the opening/closing body 2 on the right side and is provided with an operating lever P on left side in the front for the parking brake. The container holder H1 is generally referred to as a drink holder or cupholder and holds various types of plastic bottles and cups. It should be noted that the front of the main box body B is omitted from FIG. 1.

As shown in FIGS. 2 and 3, in the vehicle armrest 1, the opening/closing body 2 is provided with an inner base portion 5 that is rotatably connected to the main box body B, and an outer lid portion 6 that is movably connected to the base portion 5 to move forward and rearward in the front-rear direction. In the vehicle armrest 1, the switch knob 3 is disposed in a fixed position farther forward than the front end of the opening/closing body 2 when the lid portion 6 is moved in the forwardmost position in the main box body B.

The base portion 5 of the opening/closing body 2 is large enough to close the upper opening of the storage section A, is connected to the main box body B at a rear end section via a hinge not shown in the figure, and is biased in the opening direction (upward) by an elastic body, such as a coil spring or the like, which is mounted on the hinge shaft. The biasing force of the base portion 5 need only be sufficient to lift the front end of the opening/closing body 2 when the opening/closing body 2 is released.

Figure 2A:
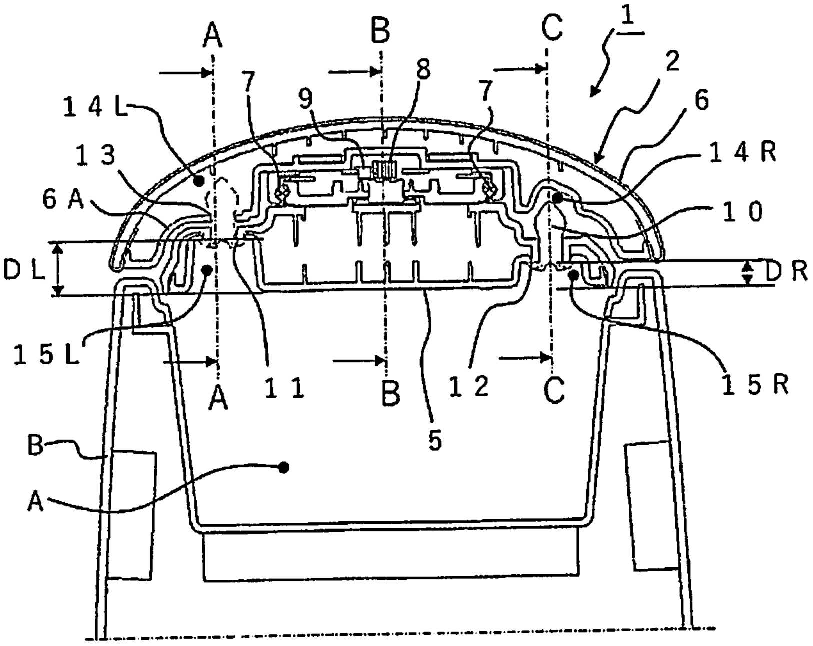
FIG. 2(A) is a lateral cross-sectional view of the main components of the storage section and the opening/closing body.

As shown in FIG. 2(A) in particular, the lid portion 6 of the opening/closing body 2 can move in the front-rear direction relative to the base portion 5 due to left and right guides 7, 7 provided between the lid portion 6 and the base portion 5, and a rack 9 that meshes with a pinion 8 disposed on the base portion 5. Appropriate friction resistance in areas of contact with the guides 7 or between the pinion 8 and the rack 9 allows the lid portion 6 to maintain an adjusted position, while force exceeding this friction resistance allows movement.

As shown in FIG. 2(A), the opening/closing body 2 in the example shown in the drawings is provided with a pin-type lock member 10 that is inserted from inside the base portion 5, and the base portion 5 has a securing hole 11 on one side in the left-right direction (left side in the drawing) for inserting the lock member 10, and a storage hole 12 on the other side (right side in the drawing) for inserting the lock member 10. The opening/closing body 2 is provided with positioning sections 13 that cause the end of the lock member 10, which has been inserted into the securing hole 11, to engage the lid portion 6 at prescribed forward positions.

Figure 3A:
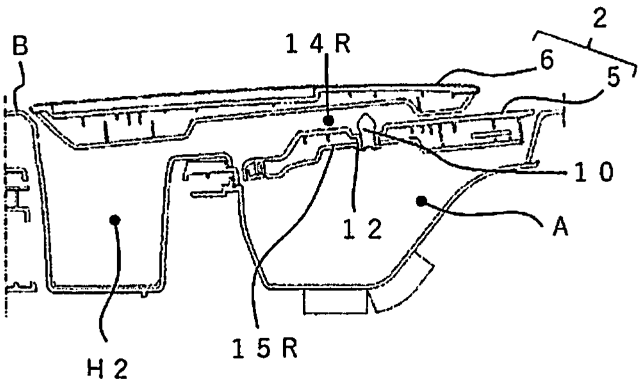
FIG. 3(A) is a cross-sectional view of the vehicle armrest as seen along line A-A in FIG. 2(A).
Figure 3B:
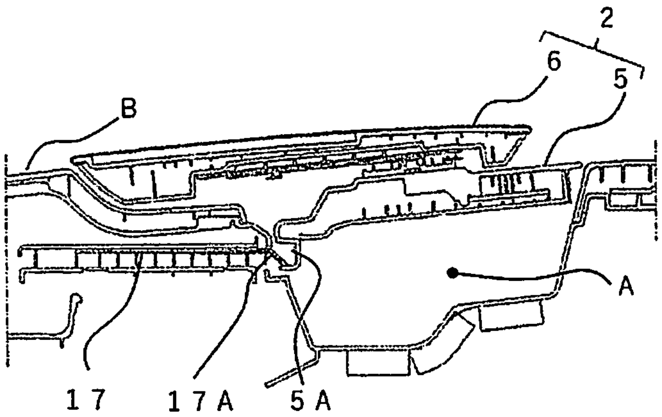
FIG. 3(B) is a cross-sectional view of the vehicle armrest as seen along line B-B.
Figure 3C:
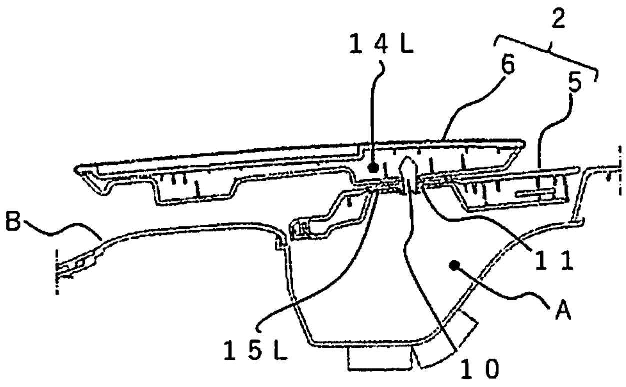
FIG. 3(C) is a cross-sectional view of the vehicle armrest as seen along line C-C.

The opening/closing body 2 is provided on either side in the left-right direction between the base portion 5 and the lid portion 6 shown in FIG. 2(A), with left and right spaces 14L and 14R into which the end of the lock member 10, which has been inserted into the securing hole 11 or the storage hole 12, enters. In the opening/closing body 2, the positioning sections 13 are disposed in the space 14L as shown in FIG. 3(C), while the space 14R is continuous in the front-rear direction along a distance equivalent to the range of movement of the lid portion 6 relative to the base portion 5, as shown in FIG. 3(A).

Figure 2B:
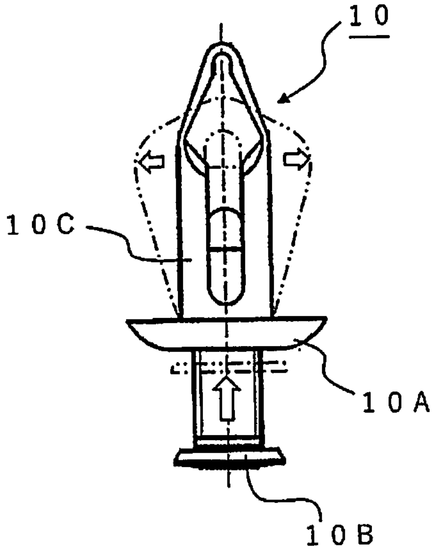
FIG. 2(B) is a side view of a trim clip for the vehicle armrest.

As shown in FIG. 2(B), the lock member 10 is a trim clip having a threaded section 10B provided along the axis of a main body section 10A, and an end section 10C that undergoes expansion deformation in the radial direction when the threaded section 10B is screwed in. The positioning sections 13 are holes into which the end section 10C of the lock member 10 enters and are formed in a plurality of locations in the front-rear direction in an inner wall 6A of the lid portion 6. The holes serving as the positioning sections 13 are located in at least two places corresponding to a forward (forwardmost end) position and a rearward (rearmost end) position of the lid portion 6, and more preferably in two or more locations including an intermediate position between the forward position and the rearward position.

The lock member 10 is inserted into either the securing hole 11 or the storage hole 12. Specifically, as indicated by the dotted line in FIG. 2(A), the opening/closing body 2 is completely mounted once the lock member 10 has passed through the securing hole 11 or the positioning section 13 and the end section 10B has undergone expansion deformation by an operation of the threaded section 10B, securing the lid portion 6 to the base portion 5.

Removing the lock member 10 from the securing hole 11 or the positioning section 13 allows the lid portion 6 to move, at which point, as indicated by the solid line in FIG. 2(A), the lock member 10 can be stored by insertion into the storage hole 12 and expansion deformation of the end section 10C, as indicated by the dotted line in FIG. 2(B). When this occurs, in the opening/closing body 2, the space 14R into which the lock member 10, which has entered the storage hole 12, has entered is continuous in the front-rear direction, and therefore the lid portion 6 can move forward and rearward without interference between the lock member 10 and the lid portion 6.

In the opening/closing body 2, the base portion 5 has recesses 15L and 15R on either side in the left-right direction on an inner surface thereof, and as shown in FIG. 3(C), the securing hole 11 is disposed in a bottom section of the recess 15L, and the storage hole 12 is disposed in a bottom section of the recess 15R. Thus, in the opening/closing body 2, the lock member 10, which has been inserted into the securing hole 11 or the storage hole 12, is prevented from protruding into the storage section A. In other words, the head of the lock member 10 is prevented from interfering with objects stored in the storage section A.

In the opening/closing body 2, depth dimension DL of the recess 15L is smaller than a depth dimension DR of the recess 15R. Therefore, in the opening/closing body 2, the space 14R into which the lock member 10, which has been inserted into the securing hole 12, enters is sufficiently large to ensure enough storage space for the lock member 10 in a space that is small in the vertical direction. Making the depth dimensions of the recesses 15L and 15R different facilitates distinguishing between securing and storage.

Furthermore, in the opening/closing body 2, the recesses 15L and 15R form short grooves that extend in the front-rear direction. Thus, in the opening/closing body 2, when the lock member 10 is pinched with the fingers for insertion or removal, the short-groove-shaped recesses 15L and 15R ensure enough space around the lock member to allow easy insertion and removal.

Figure 4A:
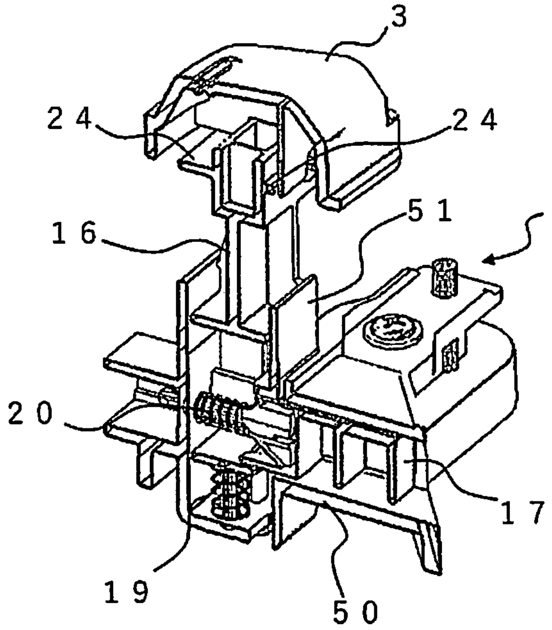
FIG. 4(A) is a perspective view of a cut model describing an operation transmission mechanism.
Figure 4B:
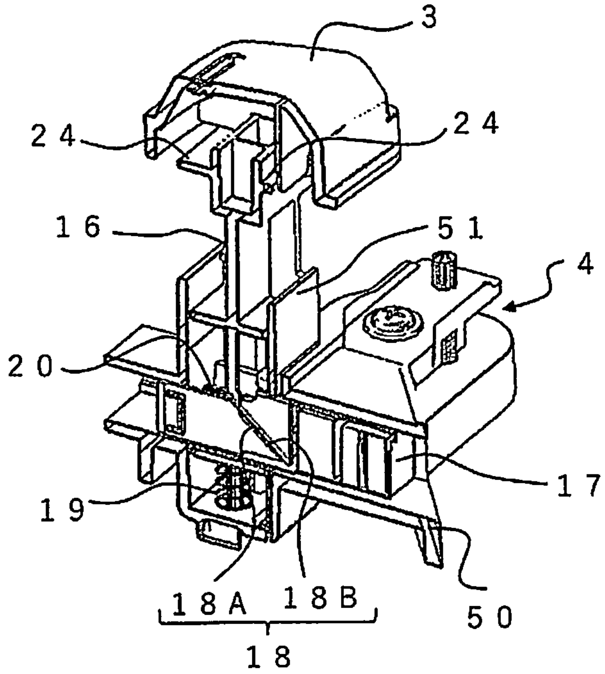
FIG. 4(B) is a perspective view of a cut model having a different sectional position from FIG. 4(A).
Figure 5A:
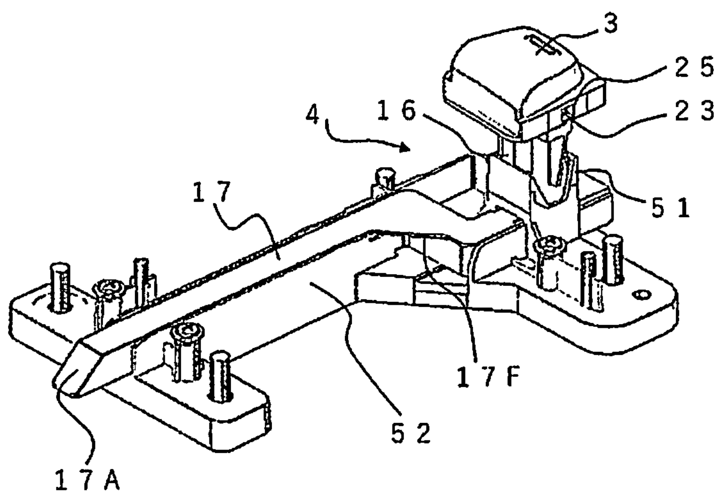
FIG. 5(A) is a perspective view describing the operation transmission mechanism.
Figure 5B:
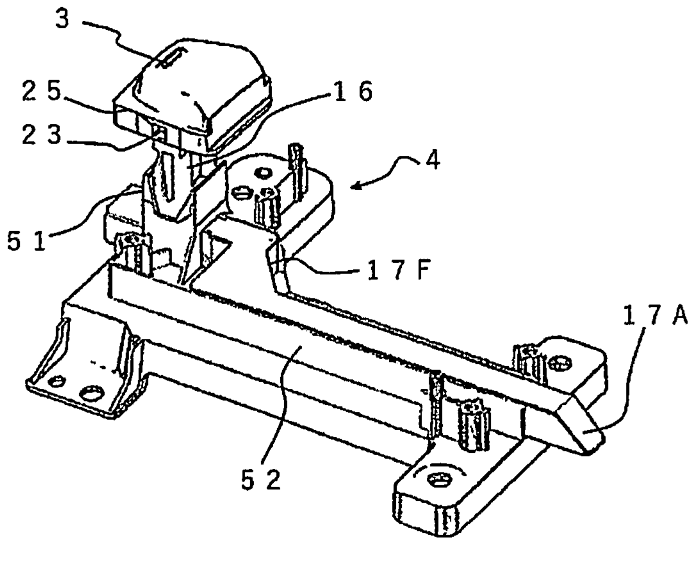
FIG. 5(B) is a perspective view of the operation transmission mechanism seen from a different direction than FIG. 5(A).

Next, as shown in FIGS. 4 and 5, an operation transmission mechanism 4 of the vehicle armrest 1 comprises a switch shaft 16 that can engage/disengage the base portion 5 of the opening/closing body 2, that is guided in the vertical direction, and that is upwardly biased; an engaging member 17 that is guided in the front-rear direction and that is rearwardly biased; and a cam mechanism 18 that converts the descending motion of the switch shaft 16 into forward motion of the engaging member 17. The switch knob 3 is fixed to the upper end of the switch shaft 16, and is disposed in a fixed position on the upper surface of the main box body B in front of the opening/closing body 2, farther forward than the front end of the opening/closing body 2 when the lid portion 6 is moved to the forwardmost position (forward limit).

The switch shaft 16 has a cam surface 18A that constitutes the cam mechanism 18 in a middle section and that is guided in the vertical direction by an upright guide section 51 formed in a housing 50, which is an internal structure of the main box body B. The cam surface 18A faces downward with a slope that rises in the forward direction. The switch shaft 16 is upwardly biased by a vertical spring 19 that is mounted on the lower end.

The engaging member 17 has a cam surface 18B that constitutes the cam mechanism 18 together with the cam surface 18A, guided in the front-rear direction by a groove-shaped guide section 52 formed in the housing 50. The cam surface 18B is an upwardly facing cam surface with a rearwardly descending slope. The engaging member 17 is rearwardly biased by a flat spring 20 disposed in front.

The switch shaft 16 and the engaging member 17 are shaped and combined such that the cam surfaces 18A and 18B are in contact with each other and reciprocal motion therebetween is not hindered by parts around the cam surfaces 18A and 18B. These structures are not particularly limited; for example, the switch shaft 16 can be a hollow body open in the front-rear direction, with the engaging member 17 passing through the hollow portion and the cam surfaces 18A and 18B disposed in the intersecting part.

The operation transmission mechanism 4 is also provided with a corresponding protrusion and recess that can engage each other in the closed position of the opening/closing body 2 between the rear end section of the engaging member 17 and the front end section of the base portion 5. In the present embodiment, as shown in FIG. 3(B) and FIG. 5, an engaging protrusion 17A is provided in the rear end section of the engaging member 17, and an engaging recess 5A is provided in the front end section of the base portion 5. The engaging protrusion 17A, which has an upwardly facing inclined surface with a rearwardly descending slope, protrudes into the storage section A and serves as a surface for pressing the engaging member 17 when the opening/closing body 2 is closed.

It should be noted that, unlike the above-described configuration, the operation transmission mechanism 4 may be provided with an engaging protrusion on the base portion 5 and an engaging recess on the engaging member 17. In this case, the engaging protrusion has a downwardly facing inclined surface with a rearwardly descending slope.

Figure 1C:
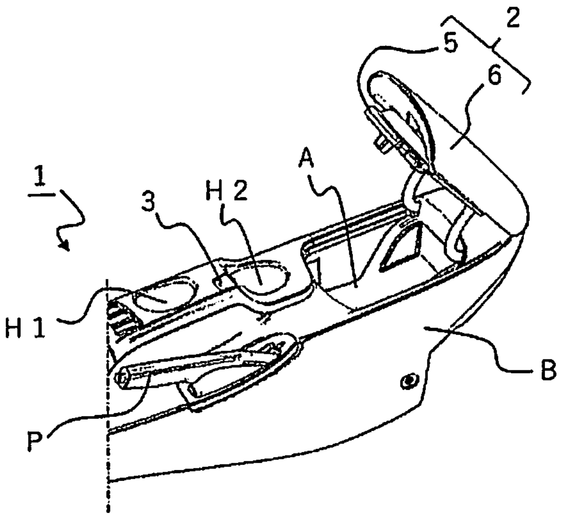
FIG. 1(C) is a perspective view of the vehicle armrest showing a state in which the opening/closing body is opened.
Figure 1D:
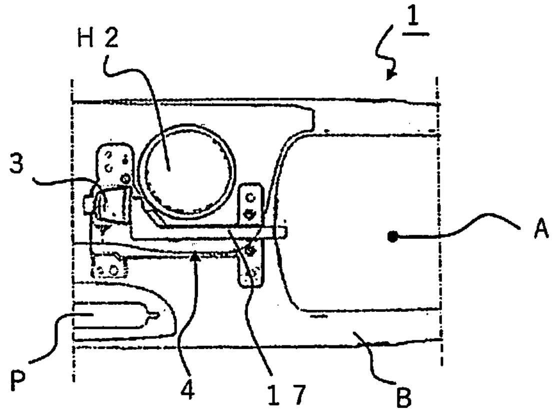
FIG. 1(D) is a top plan view of the vehicle armrest showing an operation transmission mechanism as seen through the main box body.

The main box body B is provided with an area in which the operating lever P of the parking brake can move, and a second container holder H2 that is opened and closed as the lid portion 6 moves forward and rearward with the opening/closing body 2 closed, the engaging member 17 being disposed between the movable region of operating lever P and second container holder H2, as shown in FIG. 1(D). For this reason, as shown in FIG. 5, the engaging member 17 forms a crank shape that avoids the second container holder H2 in plan view, and has a rib-shaped reinforcing section 17F in the corner section of the crank-shaped member. It should be noted that FIG. 1(D) shows the arrangement of the engaging member 17 through the main box body B.

Further, as shown in FIG. 6, the operation transmission mechanism 4 is provided with a left-right restricting portion 21 on at least either the switch knob 3 or the switch shaft 16, in contact with and restricting the movement of both in the left-right direction, and is provided with a front-rear restricting portion 22 on at least either the switch shaft 16 or the housing 50, in contact with and restricting the movement of both in the front-rear direction.

Figure 6A:
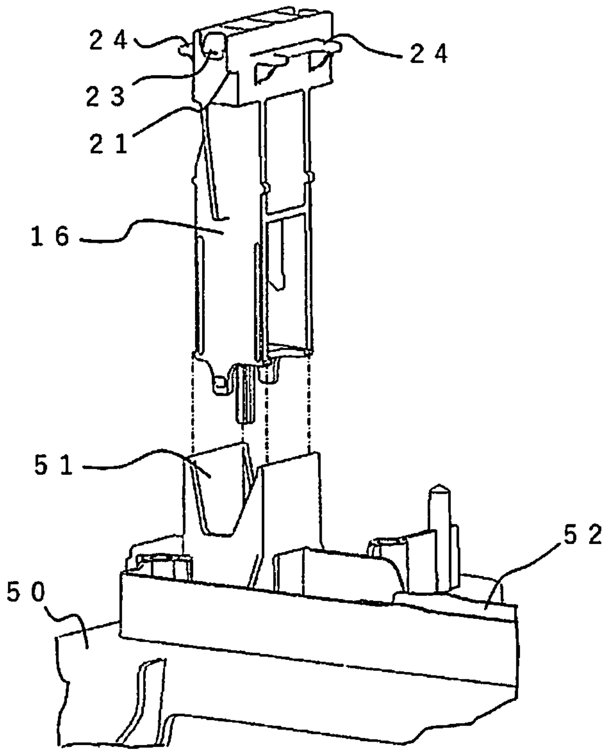
FIG. 6(A) is an exploded perspective view describing the operation transmission mechanism.

In the present embodiment, as shown in FIG. 6(A), an engaging claw 23 is provided on the right and left sides of the upper end of the switch shaft 16, and protruding pieces 24 that receive the switch knob 3 are provided on the front and rear sides of the upper end. As shown in FIG. 5(A), the switch knob 3 has an engaging hole 25 on the left and right sides, so that the engaging claws 23 elastically engage the engaging holes 25 when the knob is placed on the protruding pieces 24, thereby securing the knob to the switch shaft 16.

Figure 6B:
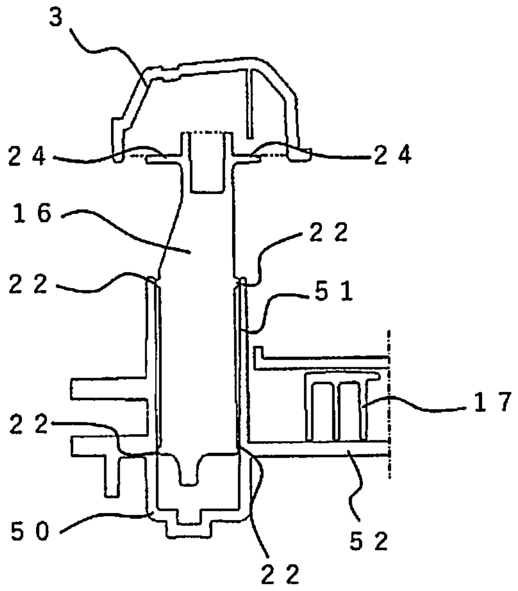
FIG. 6(B) is a vertical cross-sectional view showing part of the operation transmission mechanism.

Further, in the present embodiment, as shown in FIG. 6(A), the protruding left-right restricting portions 21 that make contact with the switch knob 3 are provided on the left and right sides of the upper end of the switch shaft 16. In the present embodiment, as shown in FIG. 6(B), the protruding front-rear restricting portions 22 that contact the housing 50 in such a way as to allow vertical movement are provided in two vertical locations on the front and rear sides of the switch shaft 16.

In the vehicle armrest 1 configured as described above, the position of the lid portion 6 of the opening/closing body 2 can be adjusted between the forward position shown in FIG. 1(A) and the rearward position shown in FIG. 2(B). As described above, the position of the lid portion 6 can be continuously adjusted by inserting the lock member 10 in the storage hole 12. Further, by inserting the lock member 10 in the securing hole 11, the position of the lid portion 6 can be adjusted in stepwise fashion and the lid portion secured in the adjusted position.

In the vehicle armrest 1, the operation transmission mechanism 4 functions when the switch knob 3 is pressed, with the opening/closing body 2 pivoting upwards and opening the storage section A, as shown in FIG. 1(C). More specifically, when the switch knob 3 is pressed, the switch shaft 16 moves down against the vertical spring 19, and the cam surface 18A thereof presses against the cam surface 18B of the engaging member 17. The engaging member 17 thereby moves in the forward direction against the flat spring 20, and the engaging protrusion 17A disengages from the engaging recess 5A of the base portion 5. When this occurs, the front end of the opening/closing body 2, upwardly biased by an elastic body not shown in the figure, rises upon being unlocked by the disengagement of the engaging protrusion 17A, opening the storage section A.

Further, in the vehicle armrest 1, when the opening/closing body 2 pivots downward, the lower end of the engaging recess 5A of the base portion 5 presses against the inclined surface of the engaging protrusion 17A, thereby pushing the engaging member 17 forward against the flat spring 20. The pressing of the opening/closing body 2 until the lower end of the engaging recess 5A passes the end of the engaging protrusion 17A causes the engaging member 17 to be pushed back by the flat spring 20, and the engaging protrusion 17A, which is protruding into the storage section A, engages the engaging recess 5A, thereby realizing a locked state.

The vehicle armrest 1 is provided with the opening/closing body 2 constituted by the inner base portion 5 and the outer lid portion 6, the switch knob 3, and the operation transmission mechanism 4, the switch knob 3 being disposed in a fixed position in the main box body B farther forward than the opening/closing body 2 when the lid portion 6 is moved into the forwardmost position. By means of this configuration, the vehicle armrest 1 is therefore provided with functionality for adjustment in the front-rear direction of the vehicle, thereby making it possible to improve ease of use by facilitating opening operations of the storage section A with the switch knob 3, which is in a fixed position, unaffected by the adjustment position of the driver's seat, etc.

In the vehicle armrest 1, since the operation transmission mechanism 4 can be removed from the base portion 5 of the opening/closing body 2, the switch knob 3 can be operated such that storage section A can be opened and closed by pivoting the opening/closing body 2 in conjunction with operation of the switch knob 3 even when the lid portion 6 is adjusted to any position within the forward and rearward movement range.

The vehicle armrest 1 uses the operation transmission mechanism 4 that is provided with the switch shaft 16, to the upper end of which the switch knob 3 is affixed, the engaging member 17, and the cam mechanism 18; and the corresponding engaging protrusion 17A and engaging recess 5A are provided on the engaging member 17 and the base portion 5. By means of this configuration, in the vehicle armrest 1, a relatively simple configuration makes it possible to arrange the switch knob 3 in a fixed position away from the opening/closing body 2, allowing reliable opening and closing operations of the opening/closing body 2.

Further, in the vehicle armrest 1, the engaging member 17 is disposed in the main box body 3 between the movable region of the operating lever P and the second container holder H2, which is opened and closed by forward and rearward movement of the opening/closing body 2. In the vehicle armrest 1, the switch knob 3 can therefore be disposed in a fixed position away from the opening/closing body 2 without interfering with the movable region of the operating lever P, thereby making it possible to realize even greater ease of use with the second container holder H2.

Further, in the vehicle armrest 1, the engaging member 17 is crank-shaped in order to avoid the second container holder H2 and has a reinforcing section 17F in the corner section of the crank-shaped member. It is thus possible in the vehicle armrest 1 to arrange the operation transmission mechanism 4 in the narrow space in the main box body B and prevent deformation of the engaging member 17 by means of the reinforcing section 17F, thereby maintaining reliable operation for an extended period of time.

Further, the vehicle armrest 1 is provided with a left-right restricting portion 21 on at least one of the switch knob 3 and the switch shaft 16, and a front-rear restricting portions 22 is provided on at least one of the switch shaft 16 and the housing 50. Thus, in the vehicle armrest 1, looseness of the switch knob 3 and the switch shaft 16 in the front-rear and left-right directions can be prevented, making it possible to maintain smooth operation of the switch knob 3 and the operation transmission mechanism 4 for an extended period of time.

It should be noted that in the foregoing embodiment, a configuration is illustrated in which the rear end of the base portion 5 of the opening/closing by 2 is pivotably linked to the main box body B, but it is also possible to use a configuration in which a side section of the base portion 5 is pivotably linked to the main box body B. In this case, the opening/closing body 2 is configured such that the outer lid portion 6 is combined with the inner base portion 5 in such a way as to allow movement in the front-rear direction and pivoting in the left-right direction of the vehicle to open and close storage section A.

The configuration of the vehicle armrest according to the present invention is not limited to the foregoing embodiment, but may be modified as deemed appropriate without departing from the essence of the present invention.

The invention claimed is:

1. A vehicle armrest that also serves as a lid for a storage section in a vehicle center console box, the vehicle armrest comprising:

an opening/closing body that opens and closes an upper side of the storage section, a switch knob for opening the opening/closing body, and an operation transmission mechanism for opening the opening/closing body in conjunction with an operation of the switch knob;

the opening/closing body including an inner base portion rotatably connected to a main box body, and an outer lid portion movably connected to the base portion to move forward and rearward in a front-rear direction; and the switch knob being disposed in a fixed position to the main box body that is farther forward than a front end of the opening/closing body when the lid portion has been moved to a forwardmost position.

2. The vehicle armrest according to claim 1, wherein the operation transmission mechanism is configured to releasably engage the base portion of the opening/closing body.

3. The vehicle armrest according to claim 2, wherein the operation transmission mechanism includes a switch shaft that is guided in a vertical direction and biased upward, an engaging member that is guided in the front-rear direction and biased rearward, and a cam mechanism that converts a downward movement of the switch shaft into a forward movement of the engaging member, an engaging protrusion and an engaging recess configured to releasably engage each other in a closed position of the opening/closing body are correspondingly arranged between a rear end of the engaging member and a front end of the base portion, and the switch knob is affixed to an upper end of the switch shaft.

4. The vehicle armrest according to claim 3, wherein the main box body includes a movable region for an operating lever of a parking brake, and a container holder that is opened and closed as the lid portion moves forward and rearward while in the closed position of the opening/closing body, and the engaging member is disposed between the movable region for the operating lever and the container holder.

5. The vehicle armrest according to claim 4, wherein the engaging member has a crank shape in a plan view that avoids the container holder, and has a reinforcing section in a corner section of the crank shape.

6. The vehicle armrest according to claim 2, wherein at least one of the switch knob and the switch shaft includes a left-right restricting portion that contacts and restricts movement of both in a left-right direction, and at least one of the switch shaft and a housing that guides the switch shaft in a vertical direction includes a front-rear restricting portion that contacts and restricts the movement of both in the front-rear direction.

7. The vehicle armrest according to claim 3, wherein
at least one of the switch knob and the switch shaft includes a left-right restricting portion that contacts and restricts movement of both in a left-right direction, and
at least one of the switch shaft and a housing that guides the switch shaft in the vertical direction includes a front-rear restricting portion that contacts and restricts the movement of both in the front-rear direction.

8. The vehicle armrest according to claim 4, wherein
at least one of the switch knob and the switch shaft includes a left-right restricting portion that contacts and restricts movement of both in a left-right direction, and
at least one of the switch shaft and a housing that guides the switch shaft in a vertical direction includes a front-rear restricting portion that contacts and restricts the movement of both in the front-rear direction.

9. The vehicle armrest according to claim 5, wherein
at least one of the switch knob and the switch shaft includes a left-right restricting portion that contacts and restricts movement of both in a left-right direction, and
at least one of the switch shaft and a housing that guides the switch shaft in a vertical direction includes a front-rear restricting portion that contacts and restricts the movement of both in the front-rear direction.

* * * * *